US012797934B2

(12) United States Patent
Krische et al.

(10) Patent No.: US 12,797,934 B2
(45) Date of Patent: Nov. 17, 2026

(54) PORTABLE ELECTRIC POWER TOOL FOR BENDING ELONGATE OBJECTS

(71) Applicant: BLACK & DECKER INC., New Britain, CT (US)

(72) Inventors: Fridtjof Krische, Mainz (DE); Tobias Heep, Idstein (DE); Daniel Kadlecek, Bischofscheim (DE); Benjamin Schmidt, Mainz (DE); Fugen Qin, Timonium, MD (US); Thaddäus Hausler, Idstein (DE)

(73) Assignee: BLACK & DECKER INC.

( * ) Notice: Subject to any disclaimer, the term of this patent is extended or adjusted under 35 U.S.C. 154(b) by 0 days.

(21) Appl. No.: 18/639,096

(22) Filed: Apr. 18, 2024

(65) Prior Publication Data

US 2025/0326019 A1 Oct. 23, 2025

(51) Int. Cl.

| | |
|---|---|
| ***B21D 7/00*** | (2006.01) |
| ***B21D 7/08*** | (2006.01) |
| ***B21D 7/12*** | (2006.01) |
| ***B25F 5/00*** | (2006.01) |

(52) U.S. Cl.
CPC ............... *B21D 7/12* (2013.01); *B21D 7/085* (2013.01); *B25F 5/00* (2013.01)

(58) Field of Classification Search
CPC ........................................................ B21D 7/00
USPC ........................................................ 173/171
See application file for complete search history.

(56) References Cited

U.S. PATENT DOCUMENTS

| | | | | |
|---|---|---|---|---|
| 9,718,108 | B2 * | 8/2017 | Latoria | B21D 11/12 |
| 10,076,376 | B2 * | 9/2018 | Bootwala | A61B 17/8863 |
| 2023/0012107 | A1 * | 1/2023 | Kadlecek | B25B 27/0014 |

FOREIGN PATENT DOCUMENTS

| | | | |
|---|---|---|---|
| CN | 209550461 | U | 10/2019 |
| CN | 110695248 | A | 1/2020 |
| CN | 117564187 | A | 2/2024 |
| JP | H11192513 | A | 7/1999 |
| WO | 2023168943 | A1 | 9/2023 |

OTHER PUBLICATIONS

EP Search Report dated Nov. 5, 2024, cited in corresponding EP Patent Application No. 24177240.9.

* cited by examiner

*Primary Examiner* — Shelley M Self
*Assistant Examiner* — Patrick B Fry
(74) *Attorney, Agent, or Firm* — Jordan IP Law, LLC; Todd A. Vaughn

(57) ABSTRACT

A portable electric power tool for bending elongate objects includes an electric motor, a bender having a body portion and a bending portion which is axially moveable relative to the body portion. The bender is operatively coupled to the electric motor for causing the axial movement between a home position and a retracted position for causing force to be applied by the bender at different locations along the length of the elongate object for bending the elongate object; a home position sensor for generating output indicative that the bending portion has reached the home position during a reset stage of operation and a controller for receiving motor turn information indicative of the number of turns of the electric motor and for monitoring the axial position of the bending portion based on the motor turn information and the output generated by the home position sensor.

20 Claims, 10 Drawing Sheets

PORTABLE ELECTRIC POWER TOOL FOR BENDING ELONGATE OBJECTS

FIELD

This specification relates to portable electric power tools for bending elongate objects such as rebar or linear conduits such as pipes or tubes.

BACKGROUND

Rebar is a term used for steel reinforcement bars around which concrete is poured during construction. The presence of rebar embedded within concrete improves the integrity of a concrete structure. Prior to concrete pouring rebar is arranged in a predetermined manner. Rebar is generally provided in the form of straight rods, to enable mass production, making it incumbent on construction workers to bend such rods into required shapes. Hydraulic rebar bending tools are known. The hydraulic nature of such tools makes them heavy and subject to high maintenance requirements. Also, it is known to rely on sensors to determine the position of movable internal components within tools but depending on multiple sensors to monitor the position of a specific internal component increases risk of tool failure because the likelihood of sensor failure increases with the number of sensors used.

SUMMARY

According to the invention there is provided a portable electric power tool for bending elongate objects according to claim 1, wherein optional features thereof are defined in claims 2 to 16.

BRIEF DESCRIPTION OF THE DRAWINGS

Various aspects and embodiments of the invention will now be described by way of non-limiting example with reference to the accompanying drawings, in which.

DETAILED DESCRIPTION

Figure 1:
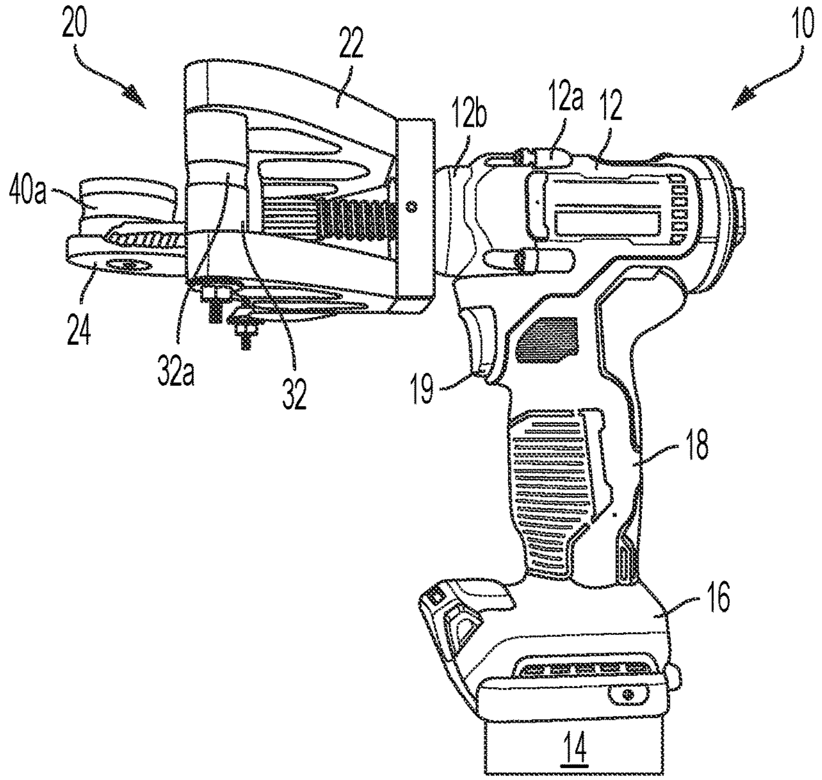
FIG. 1 is a side view of a portable electric power tool for bending rebar.

FIG. 1 shows a side cross-sectional view of a portable electric rebar bending power tool 10. The tool 10 has a housing 12 part of which is formed of a plastic clam shell type construction 12*a* having two halves which are fastened together. A battery 14 is releasably connected to the base 16 of the handle 18 via a battery attachment feature. The tool 10 has a bend mechanism 20 for bending rebar in use. A support portion 22 of the bend mechanism 20 is fixed relative to the tool housing 12, specifically to a metal part 12*b* of the housing 12. A bias portion 24 of the bend mechanism 20 is moveable relative to the tool housing 12.

Figure 2:
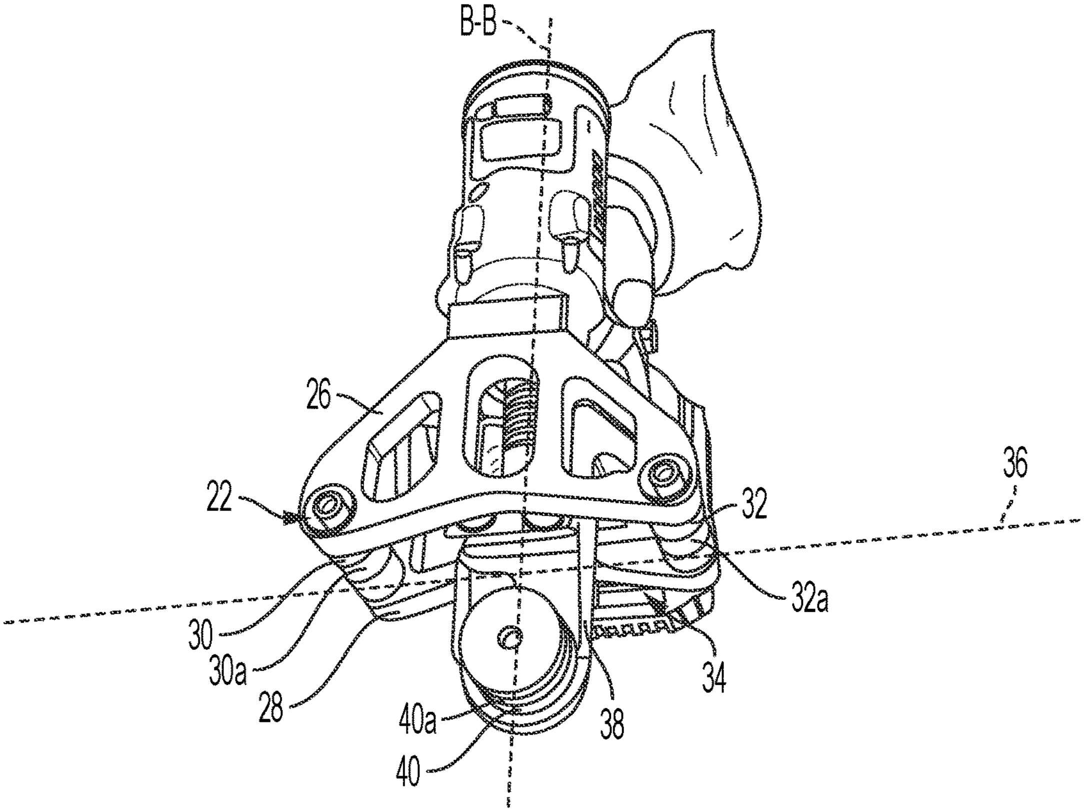
FIG. 2 is a perspective view of the portable electric power tool in FIG. 1.

FIG. 2 shows that the support portion 22 has an upper frame portion 26 and a lower frame portion 28. A first abutment portion 30 and a second abutment portion 32 each extend between the upper and lower frame portions 26, 28. Optionally the first abutment portion 30 and the second abutment portion 32 are arranged so as to be rotatable relative to the upper and lower frame portions 26, 28. The first and second abutment portions 30, 32 are separated by a gap 34 and a notional axis 36 extends between the first and second abutment portions 30, 32. The bias portion 24 has a finger 38 which supports a third abutment portion 40.

FIGS. 1 and 2 show that the first, second and third abutment portions 30, 32, 40 each have a circumferential depression 30*a*, 32*a*, 40*a*. The first, second and third abutment portions 30, 32, 40 are arranged so that the circumferential depressions 30*a*, 32*a*, 40*a* are in the same plane so that in use rebar is received in such depressions for enhancing stability of rebar during a bending operation.

As will be explained in detail, the bias portion 24 is operatively coupled to an electric motor of the rebar bending power tool 10 so that the third abutment portion 40 can be linearly moved relative to the first and second abutment portions 30, 32 along a direction (denoted B-B in FIG. 2) perpendicular to the notional axis 36 for causing the first to third abutment portions 30, 32, 40 to bend a piece of rebar.

Figure 3:
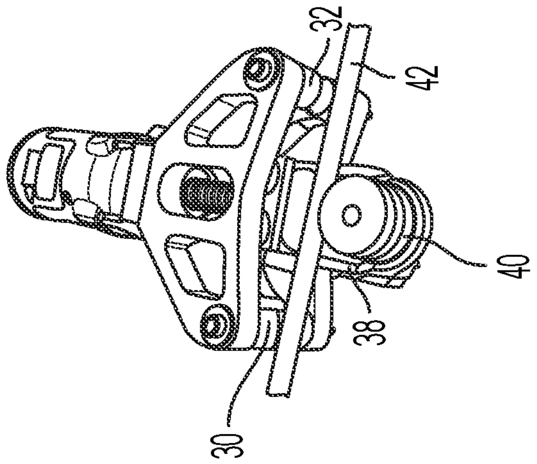
FIGS. 3, 4 and 5 show the portable electric power tool of FIGS. 1 and 2 at various stages during a bending operation.

FIG. 3 shows a piece of rebar 42 placed on the finger 38 so it lies in the same plane as the circumferential depressions 30*a*, 32*a*, 40*a* provided on the first to third abutment portions 30, 32, 40. The first and second abutment portions 30, 32 are located on a first side of the rebar 42 and the third abutment portion 40 is located on a second, opposite, side of the rebar 42.

Figure 4:
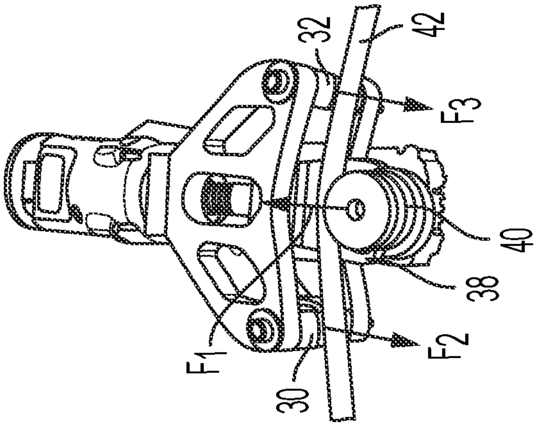

Upon pulling a trigger 19 of the tool 10 the bias portion 24 of the bend mechanism 20 is movably driven relative to the support portion 22 of the bend mechanism 20 as shown in FIG. 4. More specifically the third abutment portion 40 is forced axially along a direction (denoted B-B in FIG. 2) perpendicular to the notional axis 36, whereby the third abutment portion 40 is moved towards the gap 34 extending between the first and second abutment portions 30, 32.

During such movement the third abutment portion 40 exerts a force F1 on the rebar 42, the first abutment portion 30 exerts a force F2 on the rebar 42 and the second abutment portion 32 exerts a force F3 on the rebar 42; in the embodiment described the force F1 arises from pulling the bias portion 24 and thus retracting the finger 38 into the tool 10 whereas the forces F2 and F3 are reaction forces arising due to the rebar 42 being pressed against the first and second abutment portions 30, 32.

It will be appreciated that interaction of the rebar 42 with the first to third abutment portions 30, 32, 40 and the forces F1, F2, F3 exerted thereby on the rebar 42 cause the rebar 42 to bend. The further the third abutment portion 40 is moved relative to the first and second abutment portions 30, 32 the more the rebar 42 is bent.

Figure 5:
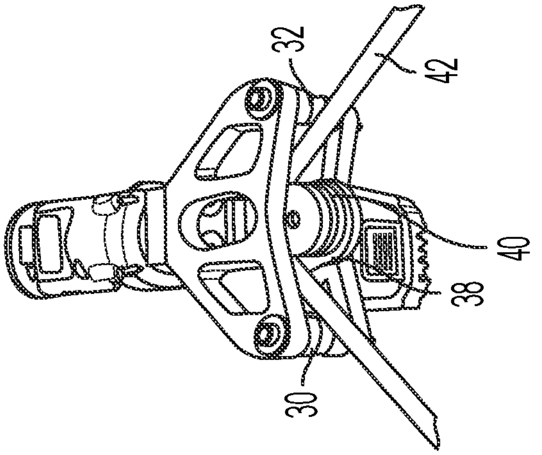

FIG. 5 shows that the third abutment portion 40 can be moved through the gap 34 between the first and second abutment portions 30, 32. The extent to which the rebar 42 is bent can thus be selectively controlled by a user of the portable rebar bending power tool 10. Naturally, moving the third abutment portion 40 in the reverse direction releases the rebar 42.

Internal features of the portable electric rebar bending power tool 10 will now be described with reference to FIG. 6 which shows a side cross-sectional view of such power tool.

The tool 10 has a controller 44 for determining that the trigger 19 has been pulled. In response to the controller 44 determining that the trigger 19 has been pulled the controller 44 generates a signal to activate an electric motor 46, which is a DC brushless motor. Persons skilled in the art will be able to select a suitable electric motor, however, an example of a suitable electric motor 46 is the BL41 DC brushless motor designed by Stanley Black & Decker Inc. and used in some commercially available DEWALT® branded power tools. The motor 46 is located in the handle 18 and has a motor output shaft 48.

Torque from the motor output shaft 48 is transferred via a transmission 50 to an input pinion 52 of a bevel gear arrangement 49. The transmission 50 comprises at least one planetary gear arrangement for reducing output speed while increasing torque. The motor output shaft 48 drives an input sun gear $\mathbf{50}_{S1}$ of the first stage of the transmission 50. The input sun gear $\mathbf{50}_{S1}$ meshes with a plurality of first stage planet gears $\mathbf{50}_{P1}$ which mesh with a stationary outer ring gear $\mathbf{50}_{R}$ and are coupled to a first stage carrier $\mathbf{50}_{C1}$. An axial extension of the first stage carrier $\mathbf{50}_{C1}$ is the input sun gear $\mathbf{50}_{S2}$ of the second stage of the transmission 50. The input sun gear $\mathbf{50}_{S2}$ meshes with a plurality of second stage planet gears $\mathbf{50}_{P2}$ which mesh with the stationary outer ring gear $\mathbf{50}_{R}$ and are coupled to a second stage carrier $\mathbf{50}_{C2}$. An axial extension of the second stage carrier $\mathbf{50}_{C2}$ is rotationally fixed to the input pinion 52 of the bevel gear arrangement.

The input pinion 52 of the bevel gear arrangement 49 thus rotates at a lower speed than the motor output shaft 48 however with an increased torque relative to the motor output shaft 48.

The motor output shaft 48, transmission 50 and input pinion 52 of the bevel gear arrangement 49 are aligned along a first axis A-A which extends along a longitudinal length of the handle 18. By also locating the battery attachment feature (and thus battery 14) on the first longitudinal axis A-A weight distribution of the tool 10 is improved, whereby the tool 10 feels balanced in a user's hand.

By locating the motor 46, the transmission 50 and the battery 14 on the same axis A-A extending along the length of the handle 18 improves weight distribution of internal features of the tool 10. Also, by providing the motor 40 within the handle 18 leaves more space available within the tool housing 12 above the handle 18, whereby there is more freedom to position features of the tool 10 in positions which improve weight distribution of internal features of the tool 10.

It will be appreciated that there is some design freedom in the transmission 50 between the motor output shaft 48 and the input pinion 52 of the bevel gear arrangement 49. In particular the number of planetary gear stages, and its (or their) configuration, forming the transmission 50 depends on the required gear ratio to be achieved between the motor output shaft 48 and the input pinion 52.

Given that it is well known that planetary gear stages step down rotation speed while stepping up torque persons skilled in the art, based on the disclosure given herein, will be able to decide upon a suitable transmission arrangement which achieves the required gear ratio for their tool to function; wherein the appropriate gear ratio depends on multiple factors including maximum achievable motor output torque, pitch of the ball screw arrangement described below, friction between moveable features within the tool 10 and the maximum permissible bending force (such as up to 100 kN). It will be appreciated that for some tools 10 a suitable transmission 50 may only have a single planetary gear stage, whereas for other tools a suitable transmission 50 may have a plurality of planetary gear stages arranged in series.

Figure 6:
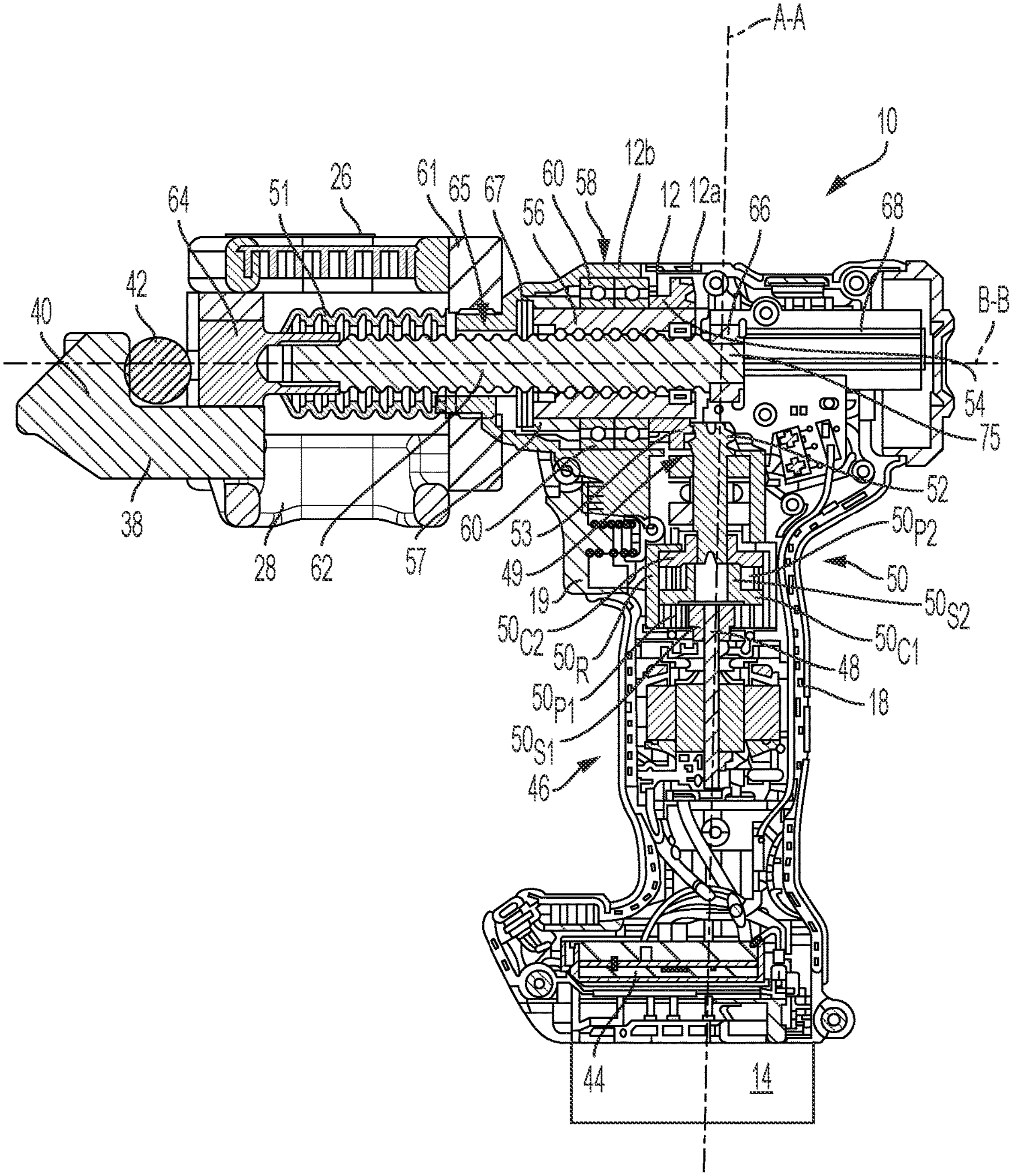
FIG. 6 is a cross-sectional view of the portable electric power tool in FIGS. 1 to 5.

Continuing with reference to FIG. 6 a bevel gear 53 of the bevel gear arrangement 49, which is meshed with the input pinion 52 for receiving torque therefrom, is provided. An axial extension of the bevel gear 53, hereafter the driving sleeve 54, is rotationally fixed relative to an input sleeve 56 of a ball screw arrangement 58. The driving sleeve 54 and input sleeve 56 are fixed relative to each other due to a friction fit arrangement. An internal surface of the input sleeve 56 comprises a threaded surface. The outer surface of the input sleeve 56 is supported by bearings 60 which enable rotation of the input sleeve 56 with respect to the housing 12. In a radial direction the bearings 60 are located between the input sleeve 56 and the inner surface of the housing 12, whereas in an axial direction the bearings 60 are located between the driving sleeve 54 and a bearing engagement sleeve 57 which is rotatably fixed to the input sleeve 56 via a friction fit engagement; part of the bearing engagement sleeve 57 lips around the outer edge of an axial bearing 67 for preventing the axial bearing 67 from touching the inner side of the housing 12. A threaded rod 62 is mounted within the input sleeve 56, which extends through the input sleeve 56. A plurality of balls, such as metal ball bearings, ride in the opposing threaded surfaces of the input sleeve 56 and threaded rod 62, thereby defining a ball screw arrangement 58.

When the input sleeve 56 is rotatably driven by the driving sleeve 54 this causes axial movement of the threaded rod 62. In other words, torque from the electric motor 46 is transferred through the transmission 50, through the bevel gear arrangement 49 to the input sleeve 56, whereby rotation thereof causes axial movement of the threaded rod 62. The threaded rod 62 is configured to move along a second longitudinal axis B-B of the tool 10. The threaded rod 62 can move forwards or backwards along the axis B-B depending on the motor driving direction, whereby the bias portion 24 moves with the threaded rod 62.

Figure 7:
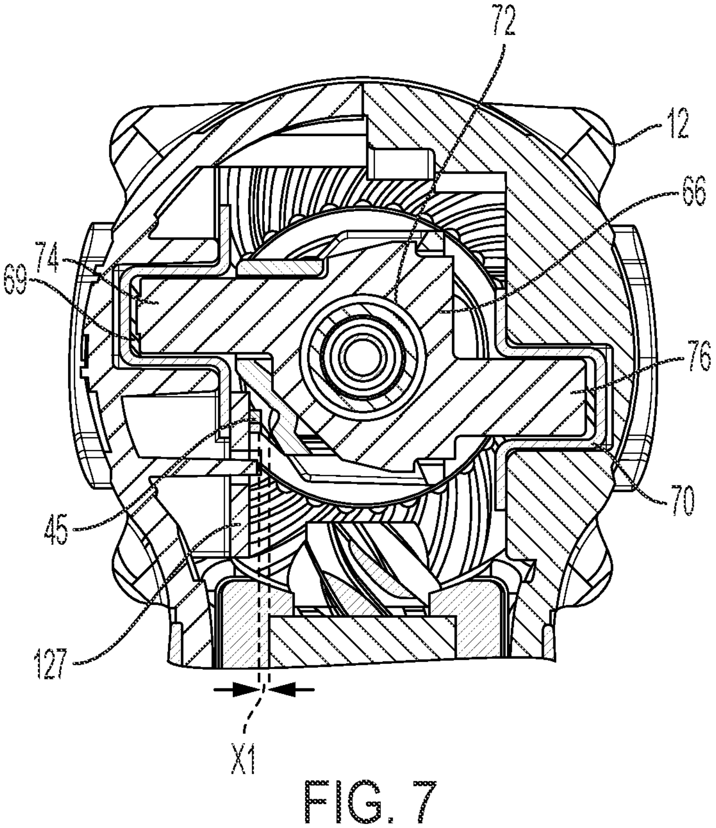
FIG. 7 is a cross-sectional view through the portable electric power tool in FIG. 6 through the axis A-A.
Figure 8:
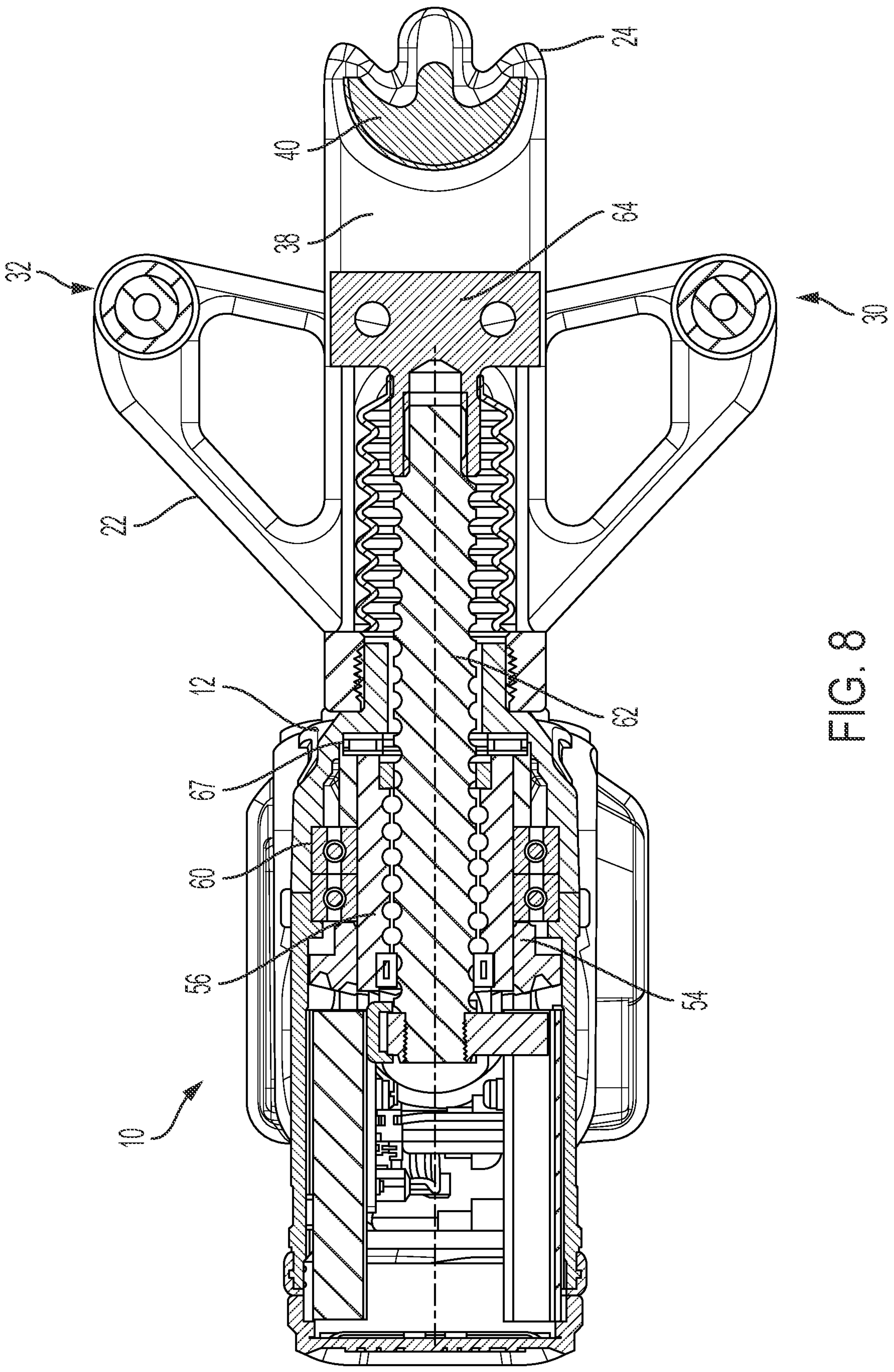
FIG. 8 is a cross-sectional view through the portable electric power tool in FIG. 6 through the axis B-B.

FIG. 7 shows that an anti-rotation bar 66 is engaged with the threaded rod 62 in a manner whereby the anti-rotation bar 66 is axially and rotationally fixed to the threaded rod 62. As the input sleeve 56 is rotated the anti-rotation bar 66 cooperates with the threaded rod 62 and slots 69, 70 within the housing 12 for causing the threaded rod 62 to move axially along the axis B-B. The anti-rotation bar 66 is rotationally fixed with respect to the housing 12 so it slides relative to the housing 12 through the slots 69, 70 during axial movement of the threaded rod 62.

The anti-rotation bar 66 comprises a central hole 72 with a threaded inner surface which is tightly threadably engaged with a reciprocal threaded portion 75 at an end of the threaded rod 62 as shown in FIG. 6.

The anti-rotation bar 66 comprises a first arm 74 and a second arm 76. The first and second arms 74, 76 are mounted in first and second slots 69, 70 within the housing 12. When the threaded rod 62 moves along the second longitudinal axis B-B, the first and second arms 74, 76 slide along the first and second slots 69, 70. The first and second slots 69, 70 extend along longitudinal axes which are parallel to the second longitudinal axis B-B.

With continued reference to FIG. 6 the finger 38 of the moveable bias portion 24 is fixed to the threaded rod 62 by a connector 64, wherein suitable connectors will be apparent to persons skilled in the art.

The threaded rod 62 extends through an opening 65 defined by the housing 12, specifically through an opening 65 defined by the metal part **12*b* of the housing 12. FIG. 6 shows an axial bearing 67 provided inside the housing 12 for supporting the threaded rod 62. The ingress of dirt and moisture through the opening 65 and into the housing 12 is blocked by a flexible bellow 51 provided between the front rim of the opening 65 and the connector 64 (the flexible bellow 51 is omitted from FIGS. 1 to 5 for purposes of illustration). The flexible bellow 51 contracts and expands in length depending on the extent to which the threaded rod 62 is retracted into the tool 10**.

The exterior of the section of the metal tool housing part **12*b* defining the opening 65 is threaded and forms a threaded connection with a frame support 61. The frame support 61 is part of the support portion 22 and carries the upper frame portion 26 and the lower frame portion 28, which can be formed integrally with the frame support 61 or be fixed thereto. In view of the foregoing it will be apparent that during tool use, when the threaded rod 62 is caused to move along the second longitudinal axis B-B, the finger 38 and third abutment portion 40 are caused to move within the space defined between the upper and lower frame portions 26, 28. A volume 68 is provided within the housing 12 for accommodating the threaded rod 62 when retracted into the tool 10**.

Figure 9:
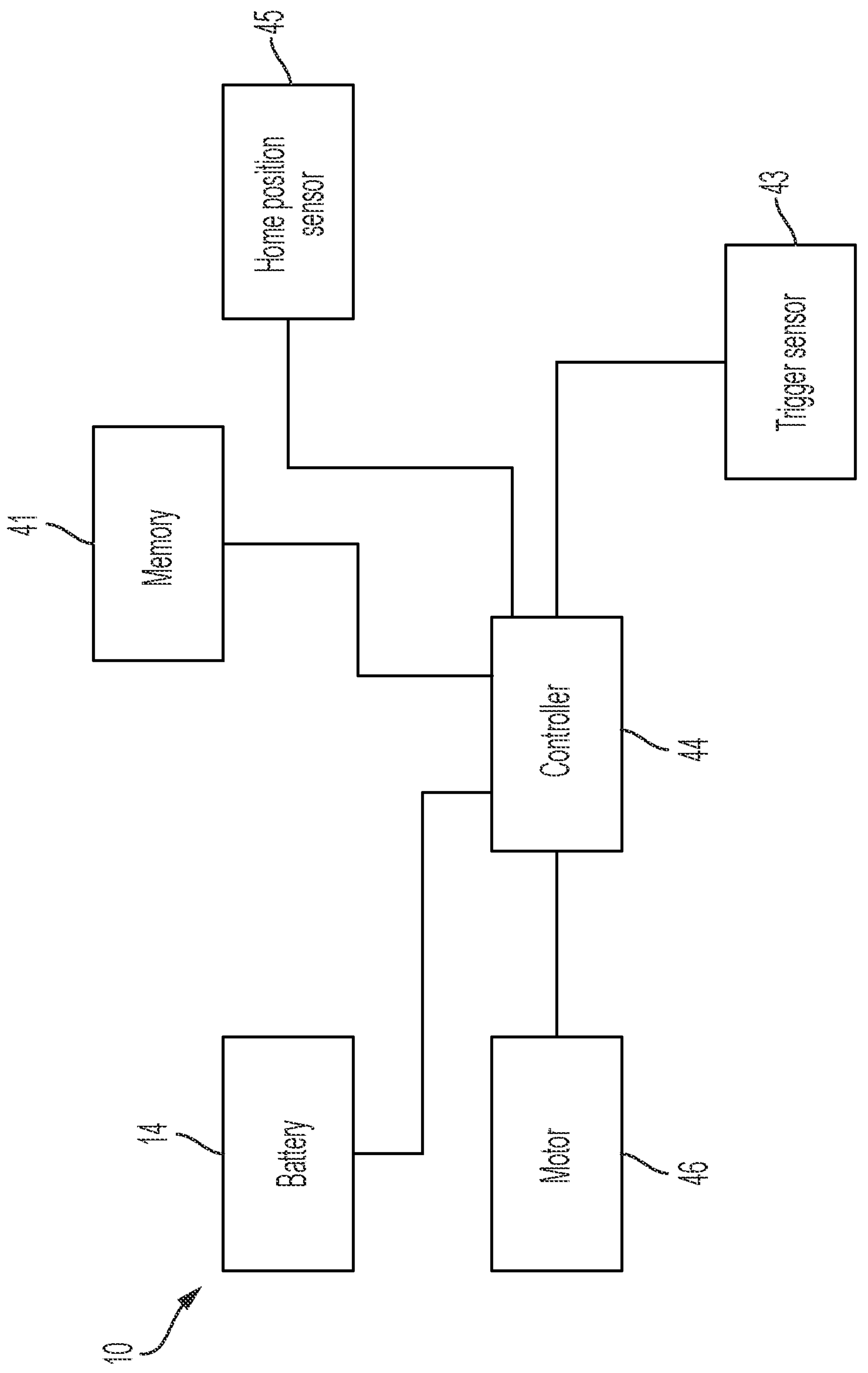
FIG. 9 shows a schematic drawing of the portable electric power tool in FIG. 6.

The controller 44 will be discussed in more detail with reference to FIG. 9 which shows a schematic diagram of the tool 10. The controller 44 is connected to the motor 46 and the battery 14. The controller 44 is configured to selectively control the motor 46 based on an actuation signal received from a trigger sensor 43 which is configured to generate a signal indicative that the trigger 19 has been pulled or released and a bias portion home position sensor 45.

The controller 44 is configured to determine the position of the bias portion 24 based on motor status information such as the number of turns (or partial turns) the motor 46 has made since initiation of the current bending operation when the bias portion 24 was in the home position. This provides that a clutch mechanism is not needed for protecting components of the tool 10 if the bending mechanism 20 is actuated beyond its intended extent such that the bias portion 24 overshoots its intended maximum range of retraction during tool use. The tool 10 can determine the absolute position of the bias portion 24 with respect to the support portion 22 of the bending mechanism 20, and thus the extent of actuation of the bending mechanism 20, every bending operation. This means that after each bending operation inaccuracies in the bias portion 24 position calculation performed by the controller 44 are reset to zero.

The bias portion home position sensor 45 is configured to generate a signal indicative that the bias portion 24 is at the home position, which is the position in which the tool 10 is ready to begin a new bending operation. Based on information received from the bias portion home position sensor 45 the controller 44 determines that the bias portion 24 is at the home position irrespective of other position data the controller 44 receives or calculates regarding the bias portion 24.

Figure 10A:
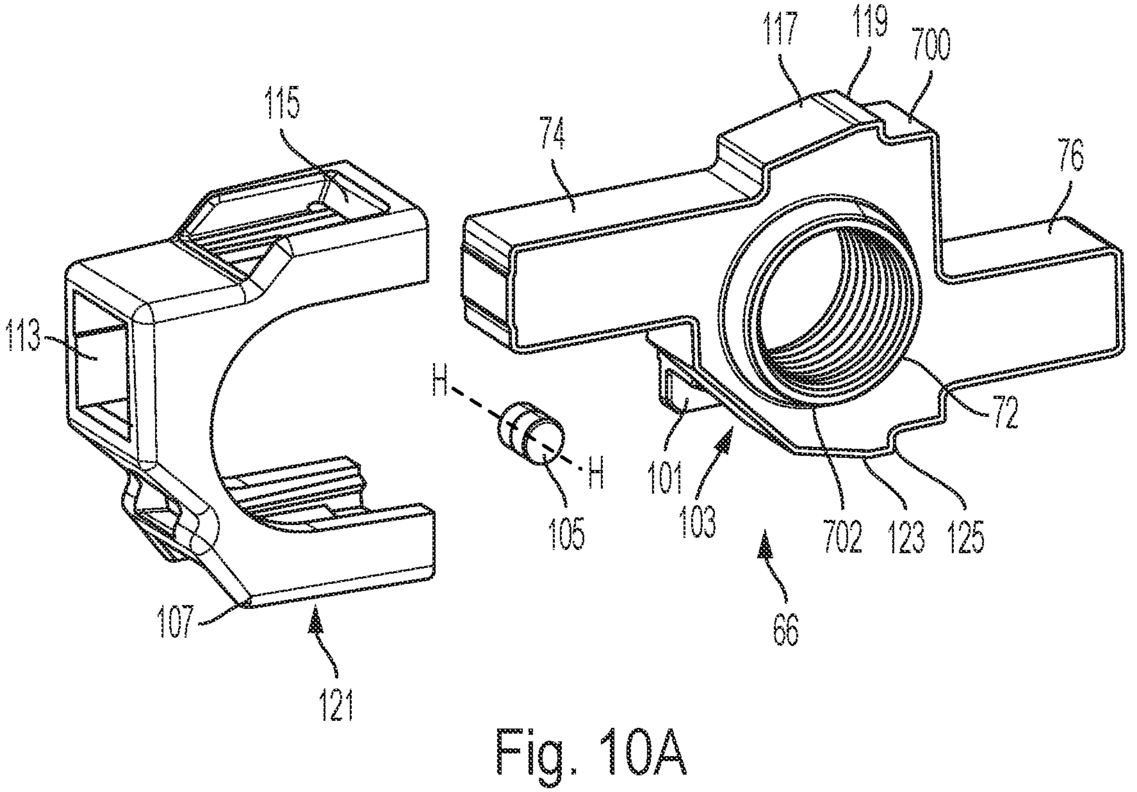
FIG. 10A shows an exploded view of a component of the portable electric power tool in FIG. 6.

FIG. 10A illustrates an exploded view of the anti-rotation bar 66 which, as already mentioned, has a central hole 72 with a threaded inner surface which is tightly threadably engaged with the reciprocal threaded surface 75 at an end of the threaded rod 62. The anti-rotation bar 66 has a mounting plate 101 projecting from a central portion 103 of the anti-rotation bar 66. A magnet 105 is mounted to the mounting plate 101. A sleeve housing 107 is mounted over the anti-rotation bar 66 as shown in FIG. 10B.

Figure 10B:
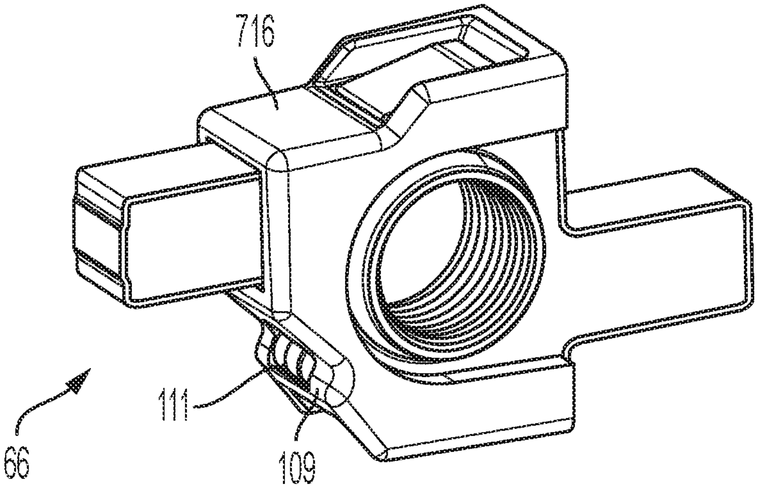
FIG. 10B shows the component in FIG. 10A in assembled form.

The sleeve housing 107 comprises a magnet pocket 109 for receiving the magnet 105 and the sleeve housing 107 ensures that the magnet 105 does not move with respect to the anti-rotation bar 66 when mounted to the anti-rotation bar as shown in FIG. 10B. The magnet pocket 109 comprises a window 111 exposing a portion of the magnet 105. This means that the sleeve housing 107 is not positioned between the magnet 105 and a Hall sensor comprising the home position sensor 45 (hereafter referred to as Hall sensor 45). Accordingly, the sleeve housing 107 itself does not attenuate the magnetic field generated from the magnet 105 in the direction of the Hall sensor 45 when the bias portion 24 is in the home position.

The sleeve housing 107 comprises an arm window 113 configured to receive the first arm 74. When the sleeve housing 107 is mounted on the anti-rotation bar 66, the first arm 74 projects through the arm window 113. The sleeve housing 107 comprises a snap-fit mechanism 115 for engaging a locking ramp 117 and snapping against a locking shoulder portion 119 of the anti-rotation bar 66. This securely engages the sleeve housing 107 against the anti-rotation bar 66. The sleeving housing 107 comprises a similar lower snap-fit mechanism 121 configured to engage a lower locking ramp 123 and snapping against a lower locking shoulder portion 125 of the anti-rotation bar 700.

Looking at FIG. 7 the tool 10 comprises a printed circuit board (PCB) 127 comprising the Hall sensor 45. The Hall sensor 45 is configured to detect the magnet 105 when the bias portion 24 is in the home position. The Hall sensor 45 and the magnet 105 are arranged to be close to each other when the bias portion 24 is in the home position. In some examples, the minimum distance X1 between the Hall sensor 45 and the magnet 105 is 1.1 mm. It has been noted that this minimum distance allows for sufficient sensitivity in the Hall sensor 45 detecting relative movement of the magnet 105 with respect to the Hall sensor 45. At the same time this allows sufficient clearance between the first and second arms 47, 76 and the first and second slots 69, 70 to allow slidable movement of the first and second arms 74, 76 in the first and second slots 69, 70.

As mentioned above, the anti-rotation bar 66 is axially and rotationally fixed relative to the threaded rod 62 and is rotationally fixed with respect to the housing 12. Given that the bias portion 24 is caused to move axially upon axial movement of the threaded rod 62 this means that the anti-rotation bar 66, the magnet 105, the threaded rod 62 and the bias portion 24 move together along the axis B-B in use. Detecting movement of the magnet 105 thus allows movement of the bias portion 24 to be detected.

The Hall sensor 45 is configured to detect a specific magnetic pole. In other words, the Hall sensor 45 is configured to detect magnetic flux of one polarity while being blind to magnetic flux of the other polarity, meaning the Hall sensor 45 generates a signal in response to detection of a specific pole of the magnet 105. For example, the Hall sensor 45 is configured to detect magnetic flux emanating from the north pole of the magnet 105 while being blind to magnetic flux emanating from the south pole of the magnet 105, meaning the Hall sensor 45 generates a signal in response to detection of the North pole of the magnet 105. The tool 10 is configured such that the middle portion of the magnet 105—the transition between north and south magnetic poles—is aligned with the Hall sensor 45 when the bias portion 24 is in the home position. That is, upon occurrence of a change in polarity of the magnetic flux to which the Hall sensor 45 is exposed then the Hall sensor 45 generates a signal which is indicative of the bias portion 24 being in the home position.

This can be used to detect when the bias portion 24 has reached its home position during a reset operation of the tool 10. Continuing with the example in which the Hall sensor 45 is configured to detect magnetic flux emanating from the north pole of the magnet 105 only while being blind to magnetic flux emanating from the south pole of the magnet 105: the magnet 105 may be aligned such that during a bending operation when the bias portion 24 is retracted and the magnet 105 moves away from the Hall sensor 45 the Hall sensor 45 is only exposed to magnetic flux emanating from the south pole of the magnet 105 meaning no signal is generated by the Hall sensor 45. During a reset operation of the tool 10 as the bias portion 24 is moved towards the home position, and the magnet 105 is moved towards the Hall sensor 45, the Hall sensor 45 is exposed to magnetic flux emanating from the south pole of the magnet 105 meaning no signal is generated by the Hall sensor 45. However, after the bias portion 24 has reached the home position and continues to move beyond the home position, the magnet 105 moves past the Hall sensor 45 such that the Hall sensor 45 is only exposed to magnetic flux emanating from the north pole of the magnet 105 meaning a signal is suddenly generated by the Hall sensor 45. The controller 44 can use this signal to determine that the reset operation is complete.

As shown in FIG. 10A, the magnet 105 comprises a magnetic axis H-H which extends in a direction between opposite poles of the magnet 105 and the magnetic axis H-H is parallel with the axis B-B of the tool 10 along which the bias portion 24 moves from the home position to a retracted position during a bending operation. In some examples the heretofore described arrangement is configured to detect variations in position of the magnet 105 as low as 0.6 mm, which means the bias portion 24 can be determined to have reached the home position to an accuracy of 0.6 mm.

Figure 11:
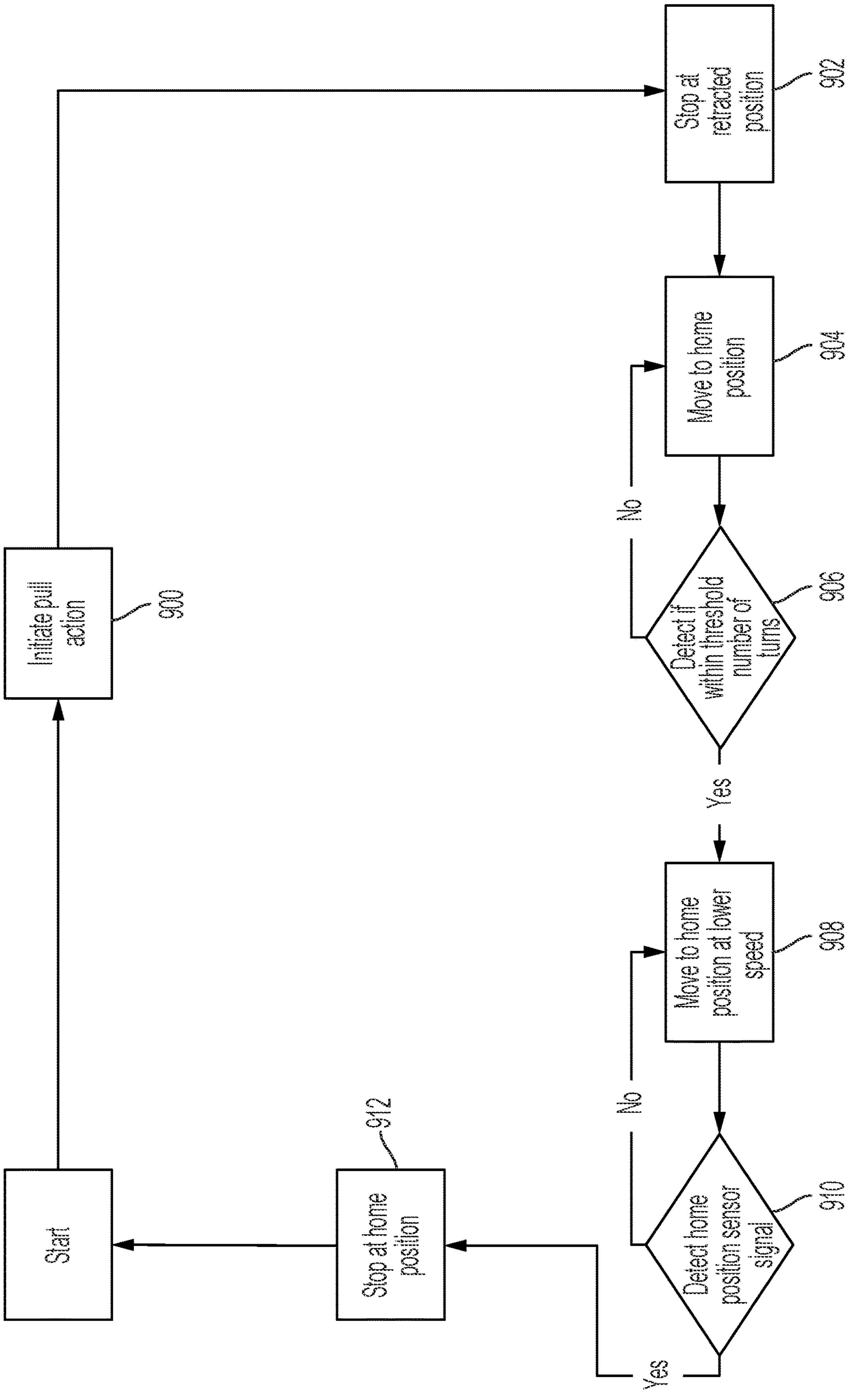
FIG. 11 shows a flow diagram showing the operation of the portable electric power tool in FIG. 6 according to a first example.

Operation of the tool 10 will now be discussed in more detail with respect to FIGS. 11, 12 and 13. FIG. 11 shows a simplified mode of operation of the tool 10. The functionality illustrated in FIG. 11 is implemented by the controller 44 on the basis of software stored in memory 41, whereby upon the controller 44 running such software it implements the functionality illustrated in FIG. 11. The controller 44 is configured to control the tool 10 based on a signal received from the Hall sensor 45 and motor status information.

Based on input from the trigger sensor 43 the controller 44 initiates a pull action operation (otherwise referred to as a bending operation) as shown in step 900 of FIG. 11. The bias portion 24 is in the home position when the controller 44 starts the pull action operation. The controller 44 starts the pull action operation 900 by issuing a control instruction to the motor 46 at time T=T1 whereby the motor 46 is caused to ramp up in speed to a predetermined target speed which is attained at time T2 shown in FIG. 13. In some examples the predetermined target speed is the maximum driving speed of the motor. In some examples the predetermined target speed may fall in the range between 24,000 RPM to 30,000 RPM. By configuring the tool 10 so that the predetermined target speed of the motor 44 between T1 and T2 is the maximum driving speed of the motor this provides that the bias portion 24 moves from the home position to the retracted position as quickly as possible. It will however be appreciated that in practice the maximum driving speed of the motor 46 is dependent on various factors such as the level of charge of the battery 14, the temperature of the battery 14, the magnitude of force required to deform the rebar being bent and the magnitude of friction experienced by internal features of the tool 10 in use.

The controller 44 issues another control instruction to stop the motor 44 when the threaded rod 62 and thus the bias portion 24 are in the retracted position as shown in step 902, wherein how this is determined is explained below. In response the motor 46 brakes at t=T3 and stops at t=T4; preferably between t=T3 and t=T4 the motor 46 is braked at the maximum achievable deceleration rate.

In one mode of operation a user manually controls the pull action by releasing the trigger 19 when they determine that the rebar being bent has been bent by a sufficient amount. Upon releasing the trigger 19 the trigger sensor 43 generates a signal indicative of this whereby the controller 44 causes the motor 46 to stop according to step 902. Subsequently if the controller 44 does not receive within a threshold amount of time another signal from the trigger sensor 43 indicative that the trigger 19 has been re-pulled the controller implements step 904 whereas if the controller 44 does receive such a signal within the threshold amount of time then it causes the motor 46 to continue the bending operation. Even during such manual mode of operation the controller 44 tracks the position of the bias portion 24 by counting the number of motor turns to have occurred during the pull action. As a safety precaution the controller 44 will stop the pull action, and implement step 902, if the motor 46 is caused to turn by a threshold number of times during the pull action.

In another mode of operation the controller 44 causes the motor 46 to retract the bias portion 24 by a particular distance based on the number of motor turns to occur during the pull action; in other words upon a user pulling the trigger 19 the controller 44 causes the motor 46 to run in a forwards direction by a threshold number of motor turns upon which the controller 44 determines that the retracted position for the current bending operation has been reached and so implements step 902, wherein said threshold can be varied based on user input to the tool 10 via a user interface.

The controller 44 is configured to receive information indicative of motor status information from the motor 46 e.g. information indicative of the number of motor turns performed. Alternatively, the controller 44 can optionally determine the number of motor turns based on information received from the motor 46 upon implementing software functionality stored in memory 41.

This means that the controller 44 is configured to determine the position of the threaded rod 62 and thus the bias portion 24 when moving towards the retracted position away from the home position based on motor status information alone.

Figure 13:
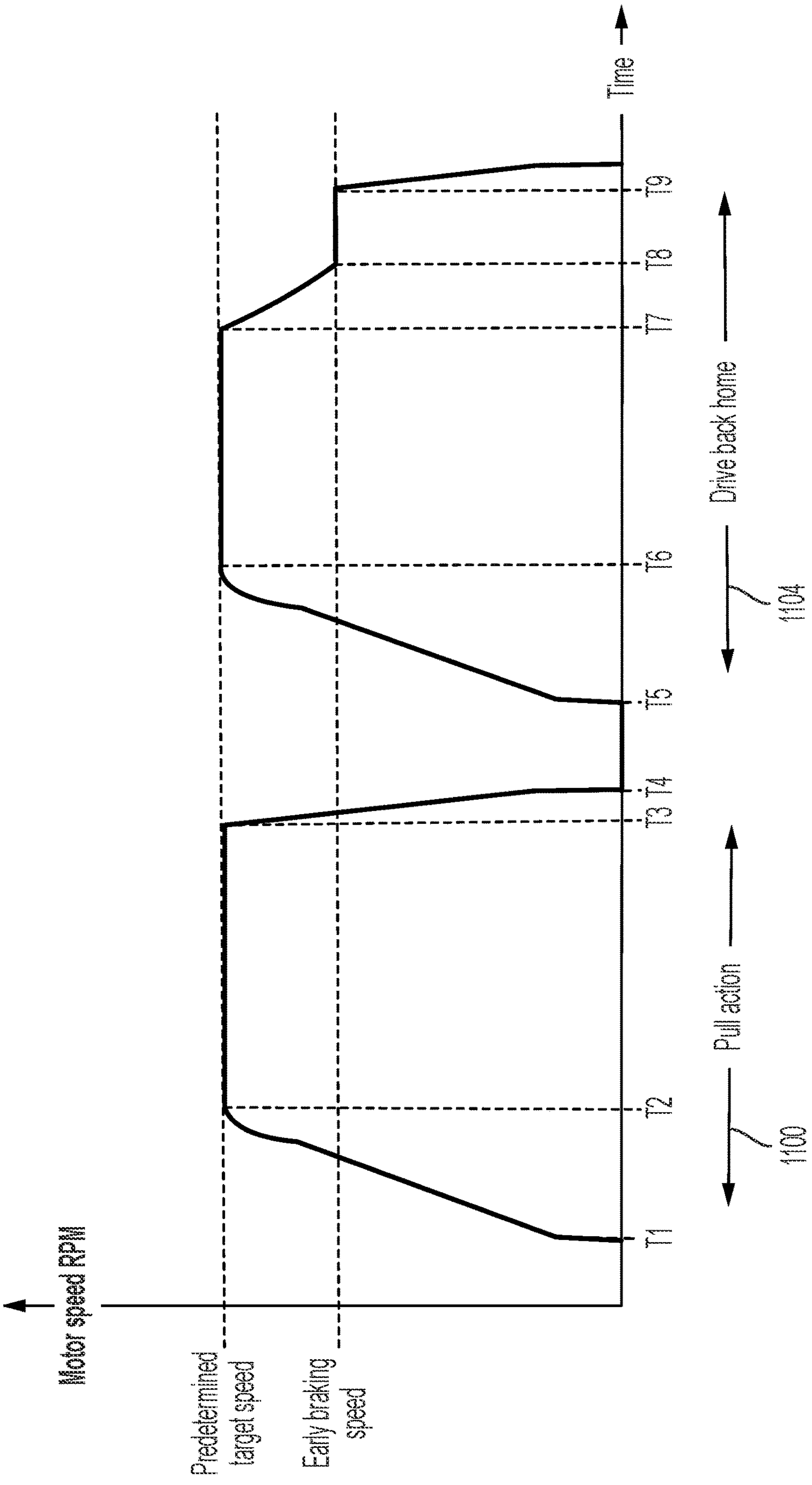
FIG. 13 shows a graph of motor speed versus time of the portable electric power tool in use.

The tool 10 then needs to perform a drive back home operation 1104 (as shown in FIG. 13), alternatively referred to as a reset operation, in order to move the bias portion 24 back to the home position in order to be ready to implement a subsequent bending operation. To enact the reset operation the controller 44 issues a control instruction to the motor 46 to drive in a reverse direction and thereby move the bias portion 24 towards the home position as shown in step 904. In response to the controller 44 issuing this instruction at T=T5 the motor 46 is caused to ramp up in speed (in a reverse direction) to the predetermined target speed which is attained at t=T6. As a reminder, in some examples the predetermined target speed is the maximum driving speed of the motor 46 so that the bias portion 24 moves from the retracted position towards the home position as quickly as possible; again though as mentioned previously the maximum driving speed of the motor 46 which is achievable in practice is dependent on various factors such as the level of charge of the battery 14, the temperature of the battery 14 and the magnitude of friction experienced by internal features of the tool 10 in use.

In order to protect the tool 10, the controller 44 does not drive the motor 46 at the predetermined target speed through the entire distance that the bias portion 24 moves from the retracted position to the home position. Instead, the controller 44 is configured to cause the motor 46 to drive in reverse direction at a reduced speed when the bias portion 24 is determined by the controller 44 to be within a threshold distance of the home position, which will be described in more detail later.

During reverse driving of the motor 46 in step 906 of FIG. 11 the controller 44 compares the number of motor turns occurring during reverse movement with the number of motor turns which occurred during the pull action operation. When the number of motor turns determined to have occurred during reverse movement is within a threshold amount of the number of motor turns which occurred during the pull action operation the controller 44 in step 908 causes the motor driving speed in the reverse direction to be reduced so that the bias portion 24 can be more precisely positioned in the home position to reduce the extent to which the bias portion 24 overshoots the home position. The threshold amount is realised in step 906 when the number of motor turns determined to have occurred during reverse movement is within 25% of the number of motor turns which occurred during the pull action operation. In other words, the threshold condition of step 906 is realised when the bias portion 24 has been driven 75% of the way back towards its home position. If during reverse driving of the motor 46 in step 906 the controller 44 determines that the threshold condition has not been satisfied the motor 46 is caused to continue driving in reverse at the predetermined target speed wherein step 906 is repeated.

Returning to FIG. 9, in response to the controller 44 in step 908 issuing a control instruction to slow the motor 46 down at time T7 the motor 46 decelerates to a predetermined early braking speed which is lower than the predetermined target speed of the motor 46 between times T2 to T3 and T6 to T7. In this way, the controller 44 provides early braking to the motor 46 before the bias portion 24 reaches the home position.

In embodiments in which the predetermined motor target speed between times T2 to T3 and T6 to T7 ranges between 24,000 RPM to 30,000 RPM the predetermined early braking speed ranges between 15,000 RM to 20,000 RPM. More specifically in an embodiment in which the target motor driving speed between T2 to T3 and T6 to T7 is 24,000 RPM the early braking speed is 15,000 RPM. In another embodiment in which the target motor driving speed between T2 to T3 and T6 to T7 is 30,000 RPM the early braking speed is 20,000 RPM.

The rate of deceleration between times T7 and T8 when the motor 114 reaches the predetermined early braking speed is such that the early braking speed is achieved before the bias portion 24 reaches the home position, wherein the rate of deceleration between T7 and T8 can be the maximum achievable deceleration rate although there is freedom to use a less steep rate of deceleration provided that the early braking speed is achieved before the bias portion 24 reaches the home position. When the early braking speed has been achieved at time t=T8 the controller 44 controls the motor 46 to keep driving at that speed until the controller 44 detects input from the Hall sensor 45 in step 910 which is indicative that the bias portion 24 has reached the home position as heretofore described. In response the controller 44 issues in step 912 at t=T9 a stop instruction to stop the motor 46 completely whereby the motor 46 decelerates (preferably at the maximum achievable deceleration rate) until the motor 46 stops turning.

When the controller 44 receives the signal from the Hall sensor 45 in step 910 the controller 44 is configured to reset the motor status information to correspond with the bias portion 24 being in the home position. For example, the controller 44 resets the active number of motor turns to zero. This means that any drift between the active number of motor turns determined by the controller 44 and the actual number of motor turns is reset to zero each time the tool 10 is operated.

This means that the controller 44 is configured to determine the position of the bias portion 24, and thereby control the operating speed of the motor 46, when the bias portion 24 is moving towards the home position away from the retracted position based on the motor status information and a signal received from the Hall sensor 45.

The bias portion 24 has now returned to the home position and the tool 10 is ready to implement a subsequent bending operation.

As already mentioned, the maximum driving speed of the motor 46 which is achievable in practice is dependent on multiple factors such as the level of charge of the battery 14, the temperature of the battery 14, the magnitude of force required to bend a particular piece of rebar and the magnitude of friction experienced by internal features of the tool 10 in use. In tools in which a bias portion 24 is driven backwards during a reset operation at maximum speed all the way until the home position is detected and a complete stop of the motor is initiated the level of overshoot passed the home position is variable based on the multiple factors effecting the maximum driving speed of the motor. Thus, when such tools are designed they need to have high tolerances built into the design to accommodate the variable extents which the bias portion 24 may overshoot the home position. The heretofore described early braking functionality addresses this issue. The early braking speed is chosen to be lower than the maximum driving speed of the motor and so is less effected by the factors mentioned above such as battery charge level, meaning that the tool 10 can more reliably control the motor 44 to operate at a specific predetermined early braking speed. By causing the motor 44 to have slowed down to the early braking speed by the time when the bias portion 24 reaches the home position means that when the home position is finally reached, and the bias portion 24 is braked hard, the bias portion 24 is always braking from the same speed regardless of tool operating conditions (e.g. ambient temperature/battery charge level) and so the level of overshoot passed the home position is more predictable meaning the tool 10 can be controlled within tighter operational tolerances, whereby the tolerances required to be built into the tool design are less.

In view of the foregoing paragraph, it will be appreciated that there is some freedom for a designer to select a suitable percentage change reduction in motor speed during a reset stage of operation between the predetermined target speed and the early braking speed. If the early braking speed is very low this will of course reduce the potential level of overshoot of the bias portion 24 passed the home position, however, the overall duration of the reset operation will be increased. On the other hand, if the early braking speed is much closer to the predetermined target speed this will reduce the overall duration of the reset operation but will increase the potential level of overshoot of the bias portion 24 passed the home position. Some balance must therefore be struck in selecting a suitable percentage change reduction in motor speed during a reset stage of operation between the predetermined target speed and the early braking speed, which maintains the potential level of overshoot of the bias portion 24 passed the home position within acceptable levels while maintaining a reasonable overall duration of the reset operation. With this in mind, it is envisaged that in some embodiments during a reset stage of operation the early braking speed can range between 50% to 80% of the predetermined target speed. In some embodiments during a reset stage of operation the early braking speed can range between 60% to 70% of the predetermined target speed. In some embodiments during a reset stage of operation the early braking speed can be range between 62% to 67% of the predetermined target speed.

Another example will now be discussed with reference to FIG. 12 which is identical to FIG. 11 except that the operation of the tool 10 comprises additional functionality which will now be described. The functionality illustrated in FIG. 12 is implemented by the controller 44 on the basis of software stored in memory 41, whereby upon the controller 44 running such software it implements the functionality illustrated in FIG. 12

The controller 44 is configured to actuate the tool 10 in response to receiving an actuation signal from the trigger sensor 43 in step 1000. The controller 44 then determines that the user wishes to use the tool 10 and in response determines whether the bias portion 24 is in the home position in step 1002. The controller 44 can determine whether the bias portion 24 is in the home position similarly to before, namely based on whether a signal is generated by the Hall sensor 45. If in step 1002 the controller 44 determines that a signal is generated by the Hall sensor 45 then the bias portion 24 is determined to be in the home position and in response the controller 44 proceeds to step 900 and initiates the pull action of step 900 as before.

Conversely if in step 1002 the controller 44 determines that a signal is not generated by the Hall sensor 45 then the bias portion 24 is determined not to be in the home position. This may be the case if power was removed before the tool 10 could finish performing a reset operation 1104. In response to the controller 44 making a negative determination in step 1002 it issues a control instruction to drive the motor 46 in reverse at a low speed in step 908 until in step 910 the controller 44 detects a signal generated by the Hall sensor 45 indicative that the bias portion 24 is in the home position; the low reverse driving speed of the motor 46 is lower than the aforementioned target driving speed between T2 to T3 and T6 to T7 discussed in connection with FIG. 13.

In some embodiments in which the target motor driving speed between T2 to T3 and T6 to T7 ranges between 24,000 to 30,000 RPM the low reverse driving speed ranges between 15,000 to 20,000 RPM. More specifically in an embodiment in which the target motor driving speed between T2 to T3 and T6 to T7 is 24,000 RPM the low reverse driving speed is 15,000 RPM. In another embodiment in which the target motor driving speed between T2 to T3 and T6 to T7 is 30,000 RPM the low reverse driving speed is 20,000 RPM.

In response to the controller 44 receiving a positive determination in step 910 subsequently the controller 44 in step 912 stops reverse driving of the motor 46 (preferably at the maximum achievable deceleration rate), whereby the bias portion 24 is now in the home position. The user then depresses the trigger 19 again and the tool repeats steps 1000, 1002 and then proceeds to step 900 to initiate the pull action.

Once the pull action has been initiated in step 900, the controller 44 determines the displacement of the bias portion 24 from the home position in the manner already described based on counting motor turns. If the controller 112 determines in step 1004 that the number of motor turns during the bending operation has reached a predetermined maximum number of motor turns stored in memory 41 (whereby the bias portion 24 is in the maximum permissible retracted position) the controller 44 stops the motor 46 in step 902 as before.

If the controller 44 makes a negative determination in step 1004 the controller 44 continues the pull action and then determines in step 1006 whether the number of motor turns during the bending operation has reached a predetermined minimum number of motor turns stored in memory 41.

If in step 1006 the controller 44 makes a negative determination the controller 44 continues the pull action.

If in step 1006 the controller 44 makes a positive determination the controller 44 then determines in step 1008 whether the trigger 19 is deactivated based on input from the trigger sensor 43.

If in step 1008 the controller 44 makes a negative determination then the controller 44 continues the pull action in step 900. However, if in step 1008 the controller 44 makes a positive determination the controller 44 stops the motor 46 in step 902 as before.

Figure 12:
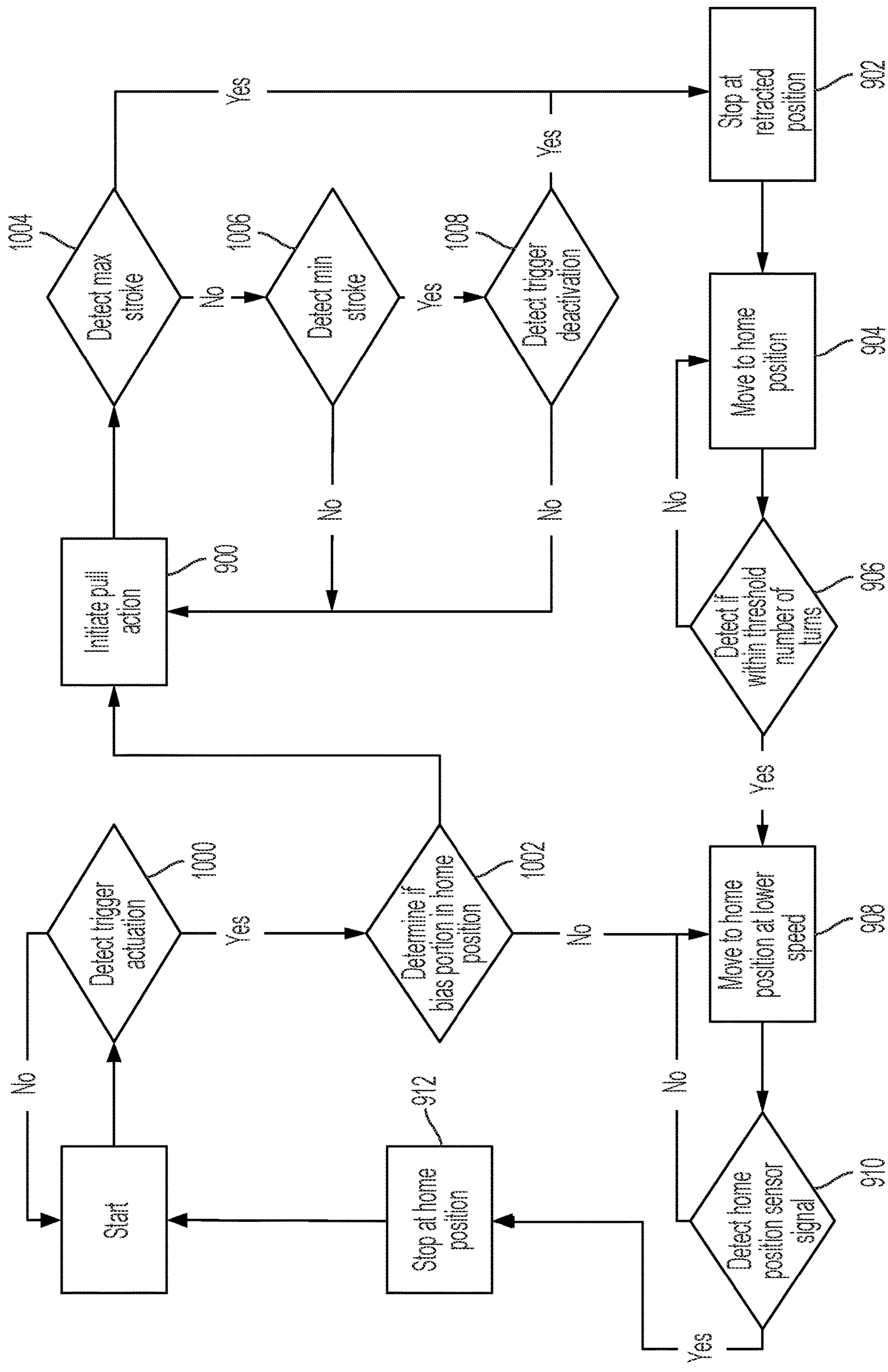
FIG. 12 shows a flow diagram showing the operation of the portable electric power tool in FIG. 6 according to a second example.

Subsequently steps 902 to 912 in FIG. 12 are implemented in a similar manner to the correspondingly numbered steps in FIG. 11 which have already been discussed.

It will be appreciated that whilst various aspects and embodiments have heretofore been described the scope of the present invention is not limited thereto and instead extends to encompass all arrangements, and modifications and alterations thereto, which fall within the spirit and scope of the appended claims.

For instance, whilst illustrative embodiments have been described as employing software it will be appreciated by persons skilled in the art that the functionality provided by such software may instead be provided by hardware (for example by one or more application specific integrated circuits), or indeed by a mix of hardware and software.

In general, the functionality described in connection with FIGS. 11 and 12 may be implemented in hardware or special purpose circuits, software, logic, or any combination thereof. For example, some aspects may be implemented in hardware while other aspects may be implemented in firmware or software which may be executed by the controller 44, microprocessor or other computing device although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or by the controller 44 or other computing devices or some combination thereof.

The examples of this disclosure may be implemented by computer software executable by a data processor or by hardware or by a combination of software and hardware. The data processing may be provided by means of one or more data processors. Further in this regard it should be noted that any blocks of the logic flow as in the Figures may represent program steps, or interconnected logic circuits, blocks and functions, or a combination of program steps and logic circuits, blocks and functions.

The memory 41 may be of any type suitable to the local technical environment and may be implemented using any suitable data storage technology, such as semiconductor based memory devices, magnetic memory devices and systems, optical memory devices and systems, fixed memory, and removable memory. Also, the controller 44 may be of any type suitable to the local technical environment, and may include one or more of general purpose microprocessors, digital signal processors (DSPs) or processors based on multi core processor architecture as non-limiting examples.

Some examples of the disclosure may be implemented as a chipset, in other words a series of integrated circuits communicating among each other. The chipset may comprise microprocessors arranged to run code, application specific integrated circuits (ASICs), or programmable digital signal processors for performing the operations described above.

As shown in FIG. 10A, the anti-rotation bar 66 optionally comprises the mounting plate 101 projecting from the central portion 103 of the anti-rotation bar 66 for receiving the magnet 105. In some other examples, the magnet 105 is mounted to the central portion 103 (or any other part of the anti-rotation bar 66) in a recess in the central portion 103. The magnet 105 is optionally mounted to the anti-rotation bar 66 (whether in a recess or on the mounting plate 101) using glue or the attractive magnetic force of the magnet 105 against the ferrous anti-rotation bar 66.

As shown in FIG. 10A, the anti-rotation bar 66 optionally comprises the sleeve housing 107 configured to secure the magnet 105 against the anti-rotation bar 66. In some other examples, the sleeve housing 107 is not provided.

It will be appreciated that the specific shape of the anti-rotation bar 66 and position of the slots 69, 70 can be adapted, provided that the anti-rotation bar 66 achieves the purpose of guiding axial movement of the threaded rod 62. Moreover, the specific location of the magnet 105 on the anti-rotation bar 66 and the way in which the magnet 105 is attached to the anti-rotation bar 66 may be adapted provided that the controller 44 is still able to determine when the bias portion 24 is in the home position based on interaction between the magnet 105 and Hall sensor 45.

In some embodiments instead of mounting the magnet 105 on the anti-rotation bar 66 the magnet 105 can alternatively be mounted to another component which moves together with the threaded rod 62 during operation of the tool 10, wherein the position of the Hall sensor 45 is correspondingly adapted.

As already described in connection with step 906 the threshold amount is realised when the number of motor turns determined to have occurred during reverse movement is within 25% of the number of motor turns which occurred during the pull action operation. However there is flexibility in the specific distance implemented in practice provided the same overall functionality is achieved, for instance in some embodiments the threshold amount is realised in step 906 when the number of motor turns determined to have occurred during reverse movement is reaches a specific percentage of the number of motor turns which occurred during the pull action operation ranging between 5% to 25% (optionally between 10% to 15%) of the number of motor turns which occurred during the pull action operation.

The motor 46 has been described as being a brushless motor and the controller 44 cooperates with the brushless motor (in particular with its control electronics) in order to control the brushless motor and determine motor status information e.g. number of motor turns. In other embodiments however the motor 46 may be a brushed motor having a motor output shaft driven by a stator and having at least one magnet on the motor output shaft. For the controller 44 to determine motor turn information of such a brushed motor the tool 10 additionally has a motor sensor (not shown) for generating output indicative of motor turn information; such as a Hall sensor which cooperates with the at least one magnet on the motor output shaft and which generates output indicative of variations in magnetic flux density as the motor shaft rotates which can be used by the controller 44 to determine motor turn information e.g. number of motor turns. Since the concept of determining motor turn information in the context of brushed and brushless motors is already known, meaning that the aforementioned ways of determining motor turn information are not the only ways of doing so, there is freedom for a designer to select a way of determining motor turn information when designing a tool 10 which implements the invention described herein. Whether or not a brushless motor is used the controller 44 can determine the direction of rotation of the motor 46 based on whether the controller 44 is implementing a pull action 900 (in which case the motor 46 will be rotating in a first direction) or whether the controller is implementing a reset operation (in which case the motor 46 will be rotating in a second direction). It is here mentioned that in battery operated embodiments the motor 46 is configured to operate using DC current, whereas in mains operated embodiments the motor is configured to operate using AC current.

In some embodiments the support portion 22 has a different configuration. The drawings show the first and second abutment portions 30, 32 to be fingers coupled to, and extending between, the upper frame portion 26 and lower frame portion 28. In some embodiments the support portion 22 is formed as a single piece, wherein the first and second abutment portions 30, 32 are formed by the edges of walls extending between the upper frame portion 26 and lower frame portion 28, wherein the walls are integrally formed with the upper frame portion 26 and lower frame portion 28.

In some embodiments the angle between the first longitudinal axis A-A and the second longitudinal axis B-B may not be 90 degrees and instead may range between 45 degrees to 145 degrees, which is achievable by adjusting the angle at which the input pinion 52 and the bevel gear 53 of the bevel gear arrangement 49 mesh.

In some embodiments the motor 46 is only partially received within the handle 18.

In some embodiments at least one planetary gear stage of the transmission 50 is received in the handle 18.

In some embodiments the motor 46 and the transmission 50 are received in the handle 18.

It has already been mentioned that by providing the motor 40 within the handle 18 leaves more space available within the tool housing 12 above the handle 18, whereby there is more freedom to position features of the tool 10 in positions which improve weight distribution of internal features of the tool 10. By providing the motor 46 only partially within the handle 18 achieves such advantage to a lesser extent. By providing the motor 46 and also at least part of the transmission 50 within the handle 18 achieves such advantage to a greater extent. By providing the motor 46 and also the transmission 50 within the handle 18 achieves such advantage to a fuller extent.

In some examples the battery 14 is removable from the tool 10 or alternatively the battery 14 is integral to the tool 10. Alternatively, or additionally the tool 10 may be configured to receive electric power from a mains power supply.

As shown in FIG. 6 the driving sleeve 54 and input sleeve 56 are fixed to each other due to a friction fit arrangement. Alternatively, the driving sleeve 54 and input sleeve 56 can be fixed via an interlocking arrangement such as a spline fit arrangement or other male and female interlocking-type arrangement.

In some embodiments the tool 10 may have a roller screw mechanism (sometimes known as a planetary roller screw mechanism) instead of a ball screw mechanism 58 for converting torque into linear force. A person skilled in the art will appreciate that this can be achieved by rotationally fixing the driving sleeve 54 to an input sleeve of the roller screw mechanism; wherein a set of rollers (sometimes called planetary rollers) are provided between the internal surface of the input sleeve and an external surface of the threaded rod 62. When the driving sleeve 54 is caused to rotate it drives rotation of the input sleeve of the roller screw mechanism and thus via the rollers causes linear movement of the threaded rod 62 and thus causes actuation of the bend mechanism 20.

Various suitable types of connector 64 will be apparent to persons skilled in the art. For example, the connector 64 has a first attachment portion for attaching to the finger 38 and also a second attachment portion for attaching to the threaded rod 62. The first attachment portion may be a plug and socket-type attachment arrangement for mating with an appropriately shaped part of the finger 38, or a threaded attachment arrangement for threadably engaging with part of the finger 38 or alternatively the first attachment portion may be attached to the finger 38 via adhesive or welding. Similarly, the second attachment portion may be a plug and socket-type attachment arrangement for mating with an appropriately shaped part of the threaded rod 62, or a threaded attachment arrangement for threadably engaging with the threaded rod 62 or alternatively the second attachment portion may be attached to the threaded rod via adhesive or welding.

In some embodiments the connector 64 is omitted and instead the threaded rod 62 is fixed directly to the finger 38 of the bias portion 24 such as via a plug and socket-type attachment whereby one of the threaded rod 62 and finger 38 plugs into the other, or via a threaded attachment arrangement whereby one of the threaded rod 62 and finger 38 is threadably received by the other, or via an adhesive arrangement whereby the threaded rod 62 is bonded to the finger 38; in some embodiments the threaded rod 62 and finger 38 are welded together.

In some embodiments the frame support 61 is fixed relative to the housing 12 in a manner different to threadably engaging the frame support 61 to the metal part 12*b* of the housing 12 as heretofore described. In some embodiments the frame support 61 may be fixed to the metal part 12*b* of the housing 12 via adhesive, welding, or one or more bolts or screws. Alternatively in some embodiments one or more bolts extend between the frame support 61 and an internal frame (backbone) of the tool 10 located within the housing 12 for fixing the frame support 61 to the frame and thus relative to the housing 12.

In the foregoing the bias portion 24 has been described as being driven relative to the stationary support portion 22 for implementing a bending operation. In other embodiments such relative motion, and thus bending operation, can be achieved by alternatively configuring the tool 10 so that the support portion 22 is driven relative to a stationary bias portion 24.

It will be appreciated that movement of the bias portion 24 and support portion 22 relative to each other is what enables a bending operation to occur, wherein based on the disclosure herein persons skilled in the art will envisage variations of the tool 10 in which either a pulling or pushing of one of the bias portion 24 and support portion 22 relative to the other of the bias portion 24 and support portion 22 implements a bending operation.

The heretofore described tool 10 has an anti-rotation bar 66 for preventing rotation of the threaded rod 62. In some embodiments the tool 10 can omit an anti-rotation bar 66 whereas rotation of the threaded rod 62 is prevented by cooperation between the bias portion 24 and support portion 22 of the bend mechanism 20 which permit relative axial movement but not relative rotational movement, in which case the magnet 105 is mounted to another suitable feature of the tool 10 which moves with the threaded rod 62 and in some embodiments the magnet 105 is coupled to an axial extension at the rear of the threaded rod 62.

Finally the heretofore described functionality need not necessarily be used exclusively in rebar bending tools but may be used in other contexts, namely portable electric power tools for bending elongate objects more generally such as metal conduits e.g. pipes or tubes.

What is claimed is:

1. A portable electric power tool for bending elongate objects, the portable electric power tool comprising:

a housing;

an electric motor situated within the housing;

a bend mechanism fixed to the housing, the bend mechanism having a body portion including an upper frame portion spaced apart from a lower frame portion, and a plurality of abutment portions including a first abutment portion and a second abutment portion extending in the space between the upper frame portion and the lower frame portion, and a third abutment portion supported by a bending portion operatively coupled to the electric motor axially displaced relative to the body portion between a home position and a retracted position causing force to be simultaneously applied by the bend mechanism to an elongate object in use at different locations along the length of the elongate object to thereby cause bending of the elongate object;

a home position sensor situated within the housing and configured to detect when the bending portion is in the home position during a reset stage of operation in which the bending portion is moved towards the home position, and generate an output signal indicative that the bending portion has reached the home position; and a controller configured to: control the electric motor; receive the output signal and motor turn information indicative of a number of turns of the electric motor; and monitor an axial position of the bending portion based on the motor turn information and the output signal generated by the home position sensor.

2. The portable electric power tool of claim 1, wherein the controller determines the bending portion has reached the home position during the reset stage of operation upon occurrence of the first to occur of the controller receiving: the output signal indicative that the bending portion has reached the home position; or the number of motor turns determined during the reset stage of operation equals the number of motor turns determined during movement of the bending portion from the home position to the retracted position.

3. The portable electric power tool of claim 2, wherein during the reset stage of operation, the controller resets the motor turn information stored in memory when the controller determines that the bending portion has reached the home position based on the output signal from the home position sensor.

4. The portable electric power tool of claim 1, wherein the controller is configured to:

determine that the bending portion has reached a maximum permissible retracted position when the controller determines the number of turns during a bending stage of operation reaches a predetermined maximum number of turns stored in memory, and stop the bending stage of operation in response to the controller determining that the bending portion has reached the maximum permissible retracted position.

5. The portable electric power tool of claim 1, wherein the home position sensor is a Hall sensor mounted in a fixed position within the housing and configured to detect a magnet which is axially fixed relative to the bending portion.

6. The portable electric power tool of claim 5, wherein the Hall sensor generates a signal when exposed to magnetic flux from the magnet of one polarity but not when exposed to magnetic flux of the other polarity and the magnet is arranged so that, as the magnet moves past the Hall sensor, the Hall sensor generates the output signal indicative that the bending portion has reached the home position during the reset stage of operation.

7. The portable electric power tool of claim 1, wherein the controller is configured to control the electric motor to move the bending portion to the home position when in response to receiving a tool actuation signal the controller determines that the bending portion is not at the home position.

8. The portable electric power tool of claim 1, wherein during the reset stage of operation, in which the bending portion is moved towards the home position, the controller is configured to decelerate the electric motor before the bending portion reaches the home position.

9. The portable electric power tool of claim 8, wherein during the reset stage of operation the controller is configured to drive the electric motor at a first target speed during a first portion of the reset stage of operation and to decelerate the electric motor upon determination by the controller that the bending portion is within a threshold distance from the home position, and wherein the magnitude of the threshold distance is 25% or less of the total distance travelled by the bending portion between the home postion and the retracted position.

10. The portable electric power tool of claim 9, wherein:

the electric motor is decelerated to a second predetermined speed which is maintained until the controller subsequently determines that the bending portion is at the home position, in response to determining that the bending portion is at the home position, the controller decelerates the motor to a stop.

11. The portable electric power tool of claim 10, wherein the second predetermined speed ranges between 50% to 80% of the first target speed.

12. The portable electric power tool of claim 9, wherein the controller is configured to determine when the bending portion is within the threshold distance from the home position when the number of motor turns determined during the reset stage of operation is within a threshold number of the number of motor turns determined during movement of the bending portion to the retracted position.

13. The portable electric power tool of claim 12, wherein the controller is configured to determine the bending portion is at the threshold distance from the home position when the number of motor turns determined to have occurred during the reset stage of operation is at least 75% of the number of motor turns determined to have occurred during movement of the bending portion to the retracted position.

14. The portable electric power tool of claim 8, wherein the first target speed is the maximum driving speed of the electric motor.

15. The portable electric power tool of claim 1, wherein the electric motor is a brushless motor and control circuitry thereof generates the motor turn information.

16. The portable electric power tool of claim 1, further comprising at least one sensor for monitoring turns of the electric motor and for generating the motor turn information.

17. The portable electric power tool of claim 1, wherein the power tool is a rebar bending tool.

18. The portable electric power tool of claim 1, wherein the power tool is at least one of a linear conduit bending tool, a pipe bending tool, or a tube bending tool.

19. A portable electric power tool comprising:

a housing;

an electric motor situated within the housing;

a bend mechanism fixed to the housing, the bend mechanism including a frame support having an upper frame portion and a lower frame portion, a first abutment portion and a second abutment portion extending in the space between the upper frame portion and the lower frame portion, and a third abutment portion supported by a bias portion that is driven by the electric motor axially relative to the frame support between a home position and a retracted position to bend an elongate object by causing a simultaneous application of force at different locations along a length of the elongate object;

a home position sensor situated within the housing and configured to detect when the bias portion is in the home position during a reset stage of operation in which the bias portion is moved towards the home position, and generate an output signal indicative that the bias portion has reached the home position; and a controller configured to: control the electric motor; receive the output signal and motor turn information indicative of the number of turns of the electric motor; and monitor an axial position of the bias portion based on the motor turn information and the output signal.

20. A portable electric power tool comprising:

a housing;

an electric motor situated within the housing;

a bend mechanism fixed to the housing, the bend mechanism including a frame support having an upper frame portion and a lower frame portion, a first abutment portion and a second abutment portion extending in the space between and rotatable relative to the upper frame portion and the lower frame portion, and a third abutment portion supported by a bias portion that is driven by the electric motor axially relative to the frame support between a home position and a retracted position to bend an elongate object by causing a simultaneous application of force at different locations along a length of the elongate object;

a home position sensor situated within the housing and configured to detect when the bias portion is in the home position during a reset stage of operation in which the bias portion is moved towards the home position, and generate an output signal indicative that the bias portion has reached the home position; and a controller configured to: control the electric motor; receive the output signal and motor turn information indicative of the number of turns of the electric motor; and monitor an axial position of the bias portion based on the motor turn information and the output signal.

* * * * *